United States Patent
Zhang et al.

(10) Patent No.: US 12,377,860 B2
(45) Date of Patent: Aug. 5, 2025

(54) METHOD, SYSTEM AND APPARATUS FOR RECOGNIZING CONTINUOUS DRIVING STYLE

(71) Applicant: Beijing Institute of Technology, Beijing (CN)

(72) Inventors: Chaopeng Zhang, Beijing (CN); Junqiang Xi, Beijing (CN); Wenshuo Wang, Beijing (CN); Yao Wei, Beijing (CN); Zhaokun Chen, Beijing (CN); Zikun Zhou, Beijing (CN)

(73) Assignee: Beijing Institute of Technology, Beijing (CN)

( * ) Notice: Subject to any disclaimer, the term of this patent is extended or adjusted under 35 U.S.C. 154(b) by 57 days.

(21) Appl. No.: 18/429,787

(22) Filed: Feb. 1, 2024

(65) Prior Publication Data
US 2025/0074431 A1    Mar. 6, 2025

(30) Foreign Application Priority Data
Aug. 30, 2023  (CN) .......................... 202311098981.3

(51) Int. Cl.
*B60W 40/09* (2012.01)
*G06F 17/18* (2006.01)

(52) U.S. Cl.
CPC ............. *B60W 40/09* (2013.01); *G06F 17/18* (2013.01); *B60W 2540/30* (2013.01)

(58) Field of Classification Search
CPC .. B60W 40/09; B60W 40/105; B60W 40/107; B60W 40/109; B60W 40/112; B60W 2540/30; B60W 2540/10; B60W 2540/12; B60W 2540/18; B60W 2520/00; B60W 2520/10; B60W 2520/105; B60W 2520/125; G06F 17/18
See application file for complete search history.

(56) References Cited

U.S. PATENT DOCUMENTS

| | | | |
|---|---|---|---|
| 10,402,771 B1* | 9/2019 | De | G08G 1/20 |
| 2019/0187707 A1* | 6/2019 | Zheng | B60W 60/00 |
| 2019/0217793 A1* | 7/2019 | Van Hoecke | B60W 30/143 |
| 2021/0188290 A1* | 6/2021 | Jin | G06F 18/25 |
| 2022/0250639 A1* | 8/2022 | Ariannezhad | B60W 40/09 |
| 2023/0076648 A1* | 3/2023 | Cardona | G06F 18/251 |

* cited by examiner

*Primary Examiner* — George C Jin
(74) *Attorney, Agent, or Firm* — Grumbles Law PLLC (57) ABSTRACT

A method, system and apparatus for recognizing continuous driving style are provided, which involve the intelligent vehicles field. The method comprises: collecting multi-dimensional driving data from a plurality of drivers in daily driving scenarios, segmenting the driving data to obtain a plurality of driving segments, calculating statistical features of each driving segment to determine high-dimensional continuous driving statistical features, reducing dimensionality of the driving statistical features to generate common factors for each driving segment, representing each driving segment with a driving word based on the common factors, representing all the driving segments of a target driver as a driving word sequence, constructing a hierarchical latent model of driving behavior, and inputting the driving word sequence into the hierarchical latent model of driving behavior to determine the continuous driving style of the target driver.

18 Claims, 3 Drawing Sheets

METHOD, SYSTEM AND APPARATUS FOR RECOGNIZING CONTINUOUS DRIVING STYLE

CROSS-REFERENCE TO RELATED APPLICATION

This patent application claims the benefit and priority of Chinese Patent Application No. 202311098981.3 filed with the China National Intellectual Property Administration on Aug. 30, 2023, the disclosure of which is incorporated by reference herein in its entirety as part of the present application.

TECHNICAL FIELD

The present disclosure relates to the field of intelligent vehicles, and in particular to a method, system and apparatus for recognizing continuous driving style.

BACKGROUND

Driving styles reflect individuals' driving habits and preferences of individuals, and vary among different individuals, exhibiting unique characteristics for each person. Consequently, individuals have personalized demands for driving experiences. With the advancement of intelligent vehicles, drivers increasingly expect their vehicles to understand their driving styles, and adjust parameters of vehicle control systems and assisted driving systems based on the driving styles, achieving personalized driving experiences that can adapt to or satisfy their own preferences. Accurate recognition of a driver's driving style is pivotal in offering such personalized experiences and in realizing safe and comfortable assisted driving.

Existing driving style recognition methods mainly involve analyzing driving data of drivers and categorizing their driving styles into discrete limited categories, such as conservative, moderate, and aggressive. However, driving styles vary significantly among individuals, posing a challenge for these discrete limited categories to accurately and finely capture the diversity of driving styles. As a result, the methods often lack precision in practical applications. For instance, a driving style that is moderate but slightly aggressive might be identified either as moderate or aggressive, demonstrating the limitations of the method.

Therefore, to accurately identify the driving styles of different drivers, there is an urgent need for a method and system of driving style recognition, which considers the personalized differences among drivers. This method could categorize a driver's driving style as a continuous parameter, providing precise and detailed driving style information for intelligent vehicles.

SUMMARY

The present disclosure aims to provide a method, system and apparatus for recognizing continuous driving style, to solve the issue of low accuracy in driving style recognition.

To achieve the aforementioned objects, the present disclosure provides the following solutions.

A method for recognizing continuous driving style is provided, including:

collecting multi-dimensional driving data from multiple drivers in daily driving scenarios, where the multi-dimensional driving data includes vehicle state data and driver operation data, where the vehicle state data includes speed, longitudinal acceleration, lateral acceleration, and yaw rate, and the driver operation data includes, throttle pedal position, brake pressure, and steering wheel angle;

segmenting the multi-dimensional driving data to obtain multiple driving segments;

calculating statistical features of the multi-dimensional driving data for each driving segment to determine high-dimensional continuous driving statistical features for all the driving segments;

reducing dimensionality of the high-dimensional continuous driving statistical features to generate common factors for each driving segment;

representing each driving segment with a driving word based on the common factors, and representing all the driving segments of a target driver as a driving word sequence based on driving words, where the driving words follow a first categorical distribution with basic driving styles as parameters, and the basic driving styles include an aggressive driving style and a moderate driving style; and inputting the driving word sequence into a hierarchical latent model of driving behavior, and outputting, by the hierarchical latent model, the continuous driving style of the target driver, where the hierarchical latent model of driving behavior is constructed based on the basic driving styles and the driving word corresponding to each driving segment, and the continuous driving style is mixture proportions of the basic driving styles learned from the driving word sequence.

In an embodiment, the segmenting the multi-dimensional driving data to obtain multiple driving segments includes:

segmenting time sequence of the multi-dimensional driving data by employing a time window, to determine the multiple driving segments.

In an embodiment, the reducing dimensionality of the high-dimensional continuous driving statistical features to generate common factors for each driving segment includes:

reducing the dimensionality of the high-dimensional continuous driving statistical features by employing factor analysis, to generate the common factors for each driving segment, where a formula of the factor analysis is: $Y=AF+e$, where Y represents the driving statistical features, A denotes a factor loading matrix, F denotes a common factor matrix and e is an error term.

In an embodiment, the representing each driving segment with a driving word based on the common factors includes:

dividing common factors of all the driving segments, by using histogram statistics, into multiple intervals with an equal probability; and constructing the driving words based on the number of the common factors and the number of the intervals.

In an embodiment, a construction process of the hierarchical latent model of driving behavior includes:

utilizing a latent variable to represent the basic driving styles, and constructing a three-layer driving behavior model by using a probabilistic model based on the basic driving styles and the driving word corresponding to each driving segment, where the three-layer driving behavior model includes a driver layer, —a basic driving style layer and —a driving word layer, and the three-layer driving behavior model is the hierarchical latent model of driving behavior; the basic driving styles follow a second categorical distribution with the continuous driving style of the target driver as a parameter; the basic driving styles corresponding to each driving segment are sampled from a driver layer-basic driving style layer categorical distribution, to generate a basic driving style sequence corresponding to all the driving segments; and based on the basic driving style sequence, the driving word corresponding to each driving segment is sampled from a basic driving style layer-driving word layer categorical distribution.

A system for recognizing continuous driving style is provided, including:

a multi-dimensional driving data acquisition module, configured to collect multi-dimensional driving data from multiple drivers in daily driving scenarios, where the multi-dimensional driving data includes vehicle state data and driver operation data, where the vehicle state data includes speed, longitudinal acceleration, lateral acceleration, and yaw rate, and the driver operation data includes throttle pedal position, brake pressure, and steering wheel angle;

a segmentation module, configured to segment the multi-dimensional driving data to obtain multiple driving segments;

a driving statistical feature determination module, configured to calculate statistical features of the multi-dimensional driving data for each driving segment to determine high-dimensional continuous driving statistical features for all the driving segments;

a dimensionality reduction module, configured to reduce dimensionality of the high-dimensional continuous driving statistical features to generate common factors for each driving segment;

a driving word computation module, configured to represent each driving segment with a driving word based on the common factors, and represent all driving segments of a target driver as a driving word sequence based on driving words; where the driving words follow a first categorical distribution with basic driving styles as parameters, and the basic driving styles include an aggressive style and a moderate driving style; and a driving style recognition module, configured to input the driving word sequence into a hierarchical latent model of driving behavior, and output, by the hierarchical latent model, the continuous driving style of the target driver; where the hierarchical latent model of driving behavior is constructed based on the basic driving styles and the driving word corresponding to each driving segment, and the continuous driving style is mixture proportions of the basic driving styles learned from the driving word sequence.

In an embodiment, the driving word calculation module includes:

an equally dividing unit, configured to divide common factors of all the driving segments, by using histogram statistics, into multiple intervals with an equal probability; and a driving word construction unit, configured to construct driving words based on the number of the common factors and the number of the intervals.

In an embodiment, a construction process of the hierarchical latent model of driving behavior includes:

a driving behavior hierarchical latent model construction unit, configured to utilize a latent variable to represent the basic driving styles and construct a three-layer driving behavior model by using a probabilistic model based on the basic driving styles and the driving word corresponding to each driving segment; where the three-layer driving behavior model includes a driver layer, —a basic driving style layer and —a driving word layer, and the three-layer driving behavior model is the hierarchical latent model of driving behavior; the basic driving styles follow a second categorical distribution with the continuous driving style of the target driver as a parameter; the basic driving styles corresponding to each driving segment are sampled from a driver layer-basic driving style layer categorical distribution, to generate a basic driving style sequence corresponding to all the driving segments; and based on the basic driving style sequence, the driving word corresponding to each driving segment is sampled from a basic driving style layer-driving word layer categorical distribution.

An electronic apparatus is provided, including a memory configured to store a computer program and a processor, where the processor executes the computer program such that the electronic apparatus implements the above-described method for recognizing continuous driving style.

A computer-readable storage medium having a computer program embodied therein is provided, where the above-described method for recognizing continuous driving style is implemented when the computer program is executed by a processor.

According to specific embodiments of the present disclosure, the following technical advantages are disclosed. A method, system, and apparatus for recognizing continuous driving style are provided, which include converting the high-dimensional continuous driving statistical features into low-dimensional sparse driving words, and inputting the low-dimensional sparse driving words into the hierarchical latent model of driving behavior to output the continuous driving style of the target driver, significantly enhancing the computational efficiency of the hierarchical latent model of driving behavior. Moreover, driving behaviors in driving segments are represented as driving words, to output the continuous driving style that represents mixture proportions of the multiple basic driving styles, which greatly improves the accuracy of driving style recognition.

BRIEF DESCRIPTION OF THE DRAWINGS

In order to explain the technical solutions in the embodiments of the present disclosure or the prior art more clearly, the drawings required for describing the embodiments will be briefly described in the following. Apparently, the drawings in the following description show merely some embodiments of the present disclosure, and those skilled in the art may derive other drawings from these drawings without creative efforts.

DETAILED DESCRIPTION OF THE EMBODIMENTS

The technology solutions in the embodiments of the present disclosure will be described in detail below in conjunction with the accompanying drawings in the embodiments of the present disclosure. Apparently, the described embodiments are only a part of the embodiments of the present disclosure, rather than all of the embodiments. Based on the embodiments of the present disclosure, all other embodiments obtained by those skilled in the art without creative efforts shall fall within the scope of protection of the present disclosure.

The objective of some embodiments of the present disclosure is to provide a method, system and apparatus for recognizing continuous driving style, to improve the accuracy of driving style recognition.

To make the above objectives, features, and advantages of the present disclosure more apparent, the present disclosure will be described in further detail with reference to the drawings and specific embodiments.

Example 1

Figure 1:
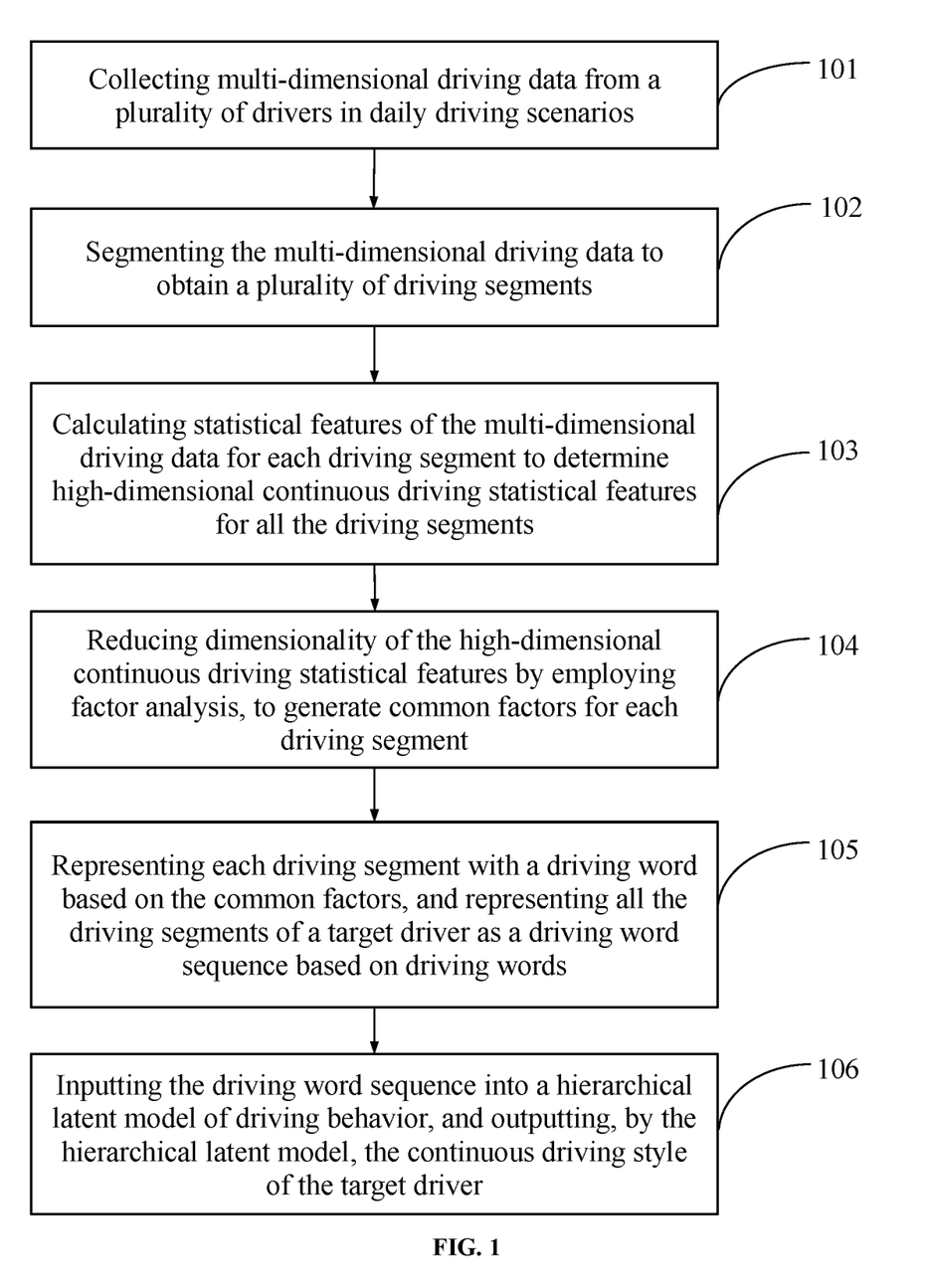
FIG. 1 is a flowchart illustrating a method for recognizing continuous driving style according to the present disclosure.

As shown in FIG. 1, the present disclosure provides a method for recognizing continuous driving style, comprising steps 101-106.

In step 101, multi-dimensional driving data are collected from D drivers in daily driving scenarios, where the multi-dimensional driving data comprise vehicle state data and driver operation data. The vehicle state data comprises speed, longitudinal acceleration, lateral acceleration, and yaw rate, etc. The driver operation data comprises throttle pedal position, brake pressure, and steering wheel angle, etc. Here, D represents the number of drivers.

In step 102, the multi-dimensional driving data is segmented to obtain multiple driving segments.

In practical applications, time sequence of the p-dimensional driving data $x_t \in \mathbb{R}^{p \times 1}$ is segmented by using a time window $\tau$, to obtain N driving segments. The i-th driving segment may be represented as follows:

$$x_i^{frag} = \{x_t\} \text{ for } t \in [(i-1)\tau, i\tau])$$

where $x_i^{frag} \in \mathbb{R}^{p \times \tau}$, i=1, 2, . . . , N; $x_i^{frag}$ denotes the i-th driving segment, $\mathbb{R}^{p \times \tau}$ denotes a real-number space with dimensions p×τ; $x_t$ denotes time sequence of the driving data, t is sampling time, and $\mathbb{R}^{p \times 1}$ denotes a real-number space with dimensions p×1.

In step 103, statistical features of multi-dimensional driving data in each driving segment are calculated to determine high-dimensional continuous driving statistical features for all driving segments.

Through calculating statistical features of the multi-dimensional driving data in each driving segment such as mean, standard deviation, maximum value and so on, statistical features of the i-th driving segment may be represented as follows:

$$y_i = [\max\{x_t\}, avg\{x_t\}, \min\{x_t\}]^T, \text{ for } t \in [(i-1)\tau, i\tau])$$

where $y_i \in \mathbb{R}^{3p \times 1}$ and $y_i$ represents the statistical features of the i-th driving segment. $\mathbb{R}^{3p \times 1}$ denotes a real-number space with dimensions 3p×1.

After obtaining the statistical features $\{y_i\}_{i=1}^N$ for all driving segments, these statistical features of all driving segments are combined into a matrix:

$$Y = \begin{bmatrix} | & | & \cdots & | \\ y_1 & y_2 & \cdots & y_N \\ | & | & \cdots & | \end{bmatrix} = \begin{bmatrix} y^{(1)} \\ y^{(2)} \\ \vdots \\ y^{(3p)} \end{bmatrix},$$

where Y represents the driving statistical features of all driving segments, and $y_N$ represents statistical features of the N-th driving segment. The j-th row of the matrix corresponds to the j-th statistical feature, denoted as $y^{(j)} \in \mathbb{R}^N$, j=1, 2, . . . , 3p, and $\mathbb{R}^N$ represents a real number space with N dimensions.

In step 104, dimensionality of the high-dimensional continuous driving statistical features is reduced to generate common factors for each driving segment.

In practical application, by employing factor analysis, the dimensionality of the driving statistical features Y of all driving segments is reduced. The formula for factor analysis is as follows:

$$Y = AF + e,$$

$$A = \begin{bmatrix} a_{11} & a_{12} & \cdots & a_{1m} \\ a_{21} & a_{22} & \cdots & a_{2m} \\ \vdots & \vdots & \ddots & \vdots \\ a_{3p,1} & a_{3p,2} & \cdots & a_{3p,m} \end{bmatrix}, F = \begin{bmatrix} f^{(1)} \\ f^{(2)} \\ \vdots \\ f^{(m)} \end{bmatrix},$$

where F represents common factor matrix, and its row vector $f^{(l)} = [f_1^{(l)}, \ldots, f_i^{(l)}, \ldots, f_N^{(l)}] \in \mathbb{R}^N$ corresponds to the l-th common factor. $f_i^{(l)}$ represents value of the l-th common factor for the i-th driving segment, and $f_N^{(l)}$ represents value of the l-th common factor for the N-th driving segment, where l=1, 2, . . . , m, m<3p, with m being dimension number of common factors. A is factor loading matrix, where element $a_{jl}$ denotes correlation between the j-th driving statistical feature and the l-th common factor, with j=1, 2, . . . , 3p. Thus, the i-th driving segment may be expressed as, $$f_i = [f_i^{(1)}, f_i^{(2)}, \ldots, f_i^{(m)}]^T,$$

where $f_i^{(m)}$ represents the m-th common factor for the i-th driving segment, and T denotes the transpose matrix.

In step 105, each driving segment is represented with a driving word based on the common factors, and all driving segments of a to-be-tested driver are represented as a driving word sequence based on driving words. The driving words follow a first categorical distribution with basic driving styles as parameters, and the basic driving styles comprise an aggressive driving style and a moderate driving style.

In practical applications, by using histogram statistics, the common factors of all driving segments, denoted as $f^{(l)} = [f_1^{(l)}, \ldots, f_i^{(l)}, \ldots, f_N^{(l)}]$, are divided into M intervals with an equal probability. Each interval has a probability of 1/M. Thus, a total of $M^m$ possible combinations can be constructed with m common factors, represented as a set $W = \{w_i\}_{i=1}^{M^m}$, where each element $w_i$ represents a specific combination, referred to as a driving word. In this case, each driving segment is represented by a specific driving word, and all driving segments of the to-be-tested driver d may be expressed as a driving word sequence $w_d$, namely $w_d = \{w_{d1}, \ldots, w_{dn}, \ldots, w_{dN}\}$, where $w_{dn}$ represents driving word for the n-th driving segment of to-be-tested driver d.

In step 106, the driving word sequence is inputted into a hierarchical latent model of driving behavior, which then outputs the continuous driving style of the to-be-tested driver. The hierarchical latent model of driving behavior is constructed based on basic driving styles and a driving word corresponding to each driving segment. The continuous driving style is mixture proportions of the basic driving styles learned from the driving word sequence.

Figure 2:
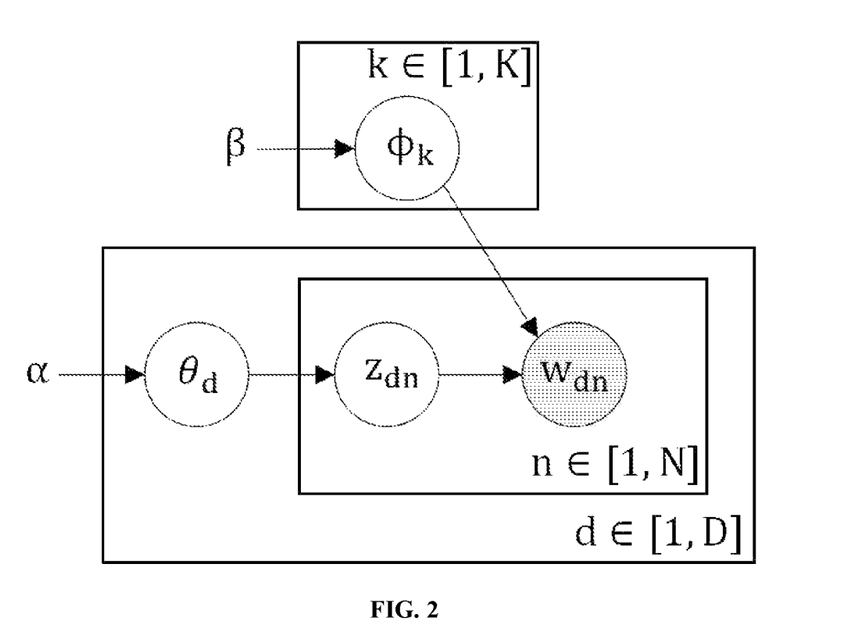
FIG. 2 is a structural diagram illustrating a hierarchical latent model of driving behavior according to the present disclosure.

In practical applications, a graphical representation of the hierarchical latent model of driving behavior is illustrated in FIG. 2, and is now explained as follows.

In view of the unobservable nature of driving style, basic driving styles are represented by a latent variable denoted as z. Based on these basic driving styles, a three-layer driving behavior model is constructed according to a probabilistic model, which is consisted of a driver layer, a basic driving style layer and a driving word layer. The basic driving styles corresponding to each driving segment are sampled from a second categorical distribution.

$$z_d \sim \text{Cat}(K, \theta_d),$$

where K represents the number of categories for basic driving styles, and an index for basic driving styles is denoted as [1, K], and $\theta_d$ is a parameter of this categorical distribution, indicating the mixture proportions of various basic driving styles for the driver, i.e., the driver's continuous driving style.

Then, the basic driving style sequence for all driving segments is represented as $z = \{z_{d1}, \ldots, z_{dn}, \ldots, z_{dN}\}$, where each element is a random variable with a value falling in the range [1, K]. Here, $z_{dn}$ represents a driving word for the n-th driving segment of the to-be-tested driver d, and $z_{dN}$ represents a driving word for the N-th driving segment of the to-be-tested driver d.

In accordance with the categories of basic driving styles, a number of the driving segments for each basic driving style is calculated as $c_d$ [$c_{d1}, \ldots, c_{dk}, \ldots, c_{dK}$], where $c_{dk}$ represents a number of the driving segments for the k-th basic driving style, and $c_{dK}$ represents a number of the driving segments for the K-th basic driving style.

$c_d$ follows a multinomial distribution:

$$c_d \sim \text{Multi}(N, \theta_d).$$

Through treating the continuous driving style $\theta_d$ of the driver as a random variable, for facilitating model computation by using the conjugate property of the Dirichlet distribution with the categorical distribution, the continuous driving style $\theta_d$ is sampled from the Dirichlet distribution:

$$\theta_d \sim \text{Dir}(K, \alpha),$$

where $\alpha = [\alpha_1, \ldots, \alpha_K]$ represents hyperparameters of the Dirichlet distribution, where $\alpha_K$ corresponds to a hyperparameter of the Dirichlet distribution for the K-th basic driving style.

Each driving segment corresponds to one driving word, and there are known to be $M^m$ driving words. The driving word $w_d$ corresponding to each driving segment is considered as a random variable, and the probability distribution between the k-th basic driving style and the driving word is modeled with the categorical distribution, i.e., the driving word follows a categorical distribution with the basic driving style as a parameter, $$w_d \sim \text{Cat}(M^m, \phi_k),$$

where $\phi_k = [\phi_{k1}, \ldots, \phi_{ki}, \ldots, \phi_{kM^m}]$, and $\sum_{i=1}^{M^m} \phi_{ki} = 1$; $\phi_k$ represents a random variable related to the k-th basic driving style, where $\phi_{ki}$ denotes a probability of generating the i-th driving word $w_i$ under the k-th basic driving style.

All driving segments may be represented as the driving word sequence $w = \{w_1, \ldots, w_N\}$, where $w_N$ represents the driving word for the N-th driving segment.

Based on different driving words, a number of driving segments for each driving word is obtained as $\pi_d = [\phi_{d1}, \ldots, \pi_{di}, \ldots, \pi_{dM^m}]$, where $\pi_{di}$ represents a number of driving segments of the i-th driving word, and $\pi_{dM^m}$ represents a number of driving segments of the $M^m$-th driving word.

$\pi_d$ follows a multinomial distribution, $$\pi_d \sim \text{Multi}(N, \phi_k),$$

To facilitate computation, by means of the conjugate property of the Dirichlet distribution with the categorical distribution, the distribution of the random variable $\phi_k$ is modelled by using the Dirichlet distribution, $$\phi_k \sim \text{Dir}(M^m, \beta),$$

where $\beta = [\beta_1, \ldots, \beta_{M^m}]$ represents hyperparameters of the Dirichlet distribution, and $\beta_{M^m}$ corresponds to a hyperparameters of the Dirichlet distribution for the $M^m$-th driving word.

In practical applications, the driving word sequence $w_d$ is input into the hierarchical latent model of driving behavior, which then outputs the continuous driving style $\theta_d$ for the to-be-tested driver d, where $\theta_d = [\theta_{d1}, \ldots, \theta_{dK}]$, and $\sum_{k=1}^{K} \theta_{dK} = 1$. Here, K is a hyperparameter and represents a number of basic driving styles, $\theta_{dk}$ represents the proportion of the k-th basic driving style, and $\theta_{dK}$ represents the proportion of the K-th basic driving style.

Preferably, when K=2, the basic driving styles include an aggressive driving style and a moderate driving style, the output of the hierarchical latent model of driving behavior is represented as a mixture proportion $\theta_d = [\theta_{d1}, \theta_{d2}]$ of the aggressive driving style and moderate driving style, where $\theta_{d1}$ corresponds to aggressive driving style, and $\theta_{d2}$ corresponds to moderate driving style. Consequently, the driving style of driver d may be represented as a continuous value $\theta_d$.

When K=3, the basic driving styles further include conservative driving style or slightly aggressive driving style.

When K=4, the basic driving styles further include conservative driving style and slightly aggressive driving style.

Example 2

In order to implement the method according to Example 1 and achieve the corresponding functionalities and technical effects, a system for recognizing continuous driving style is provided as follows.

Figure 3:
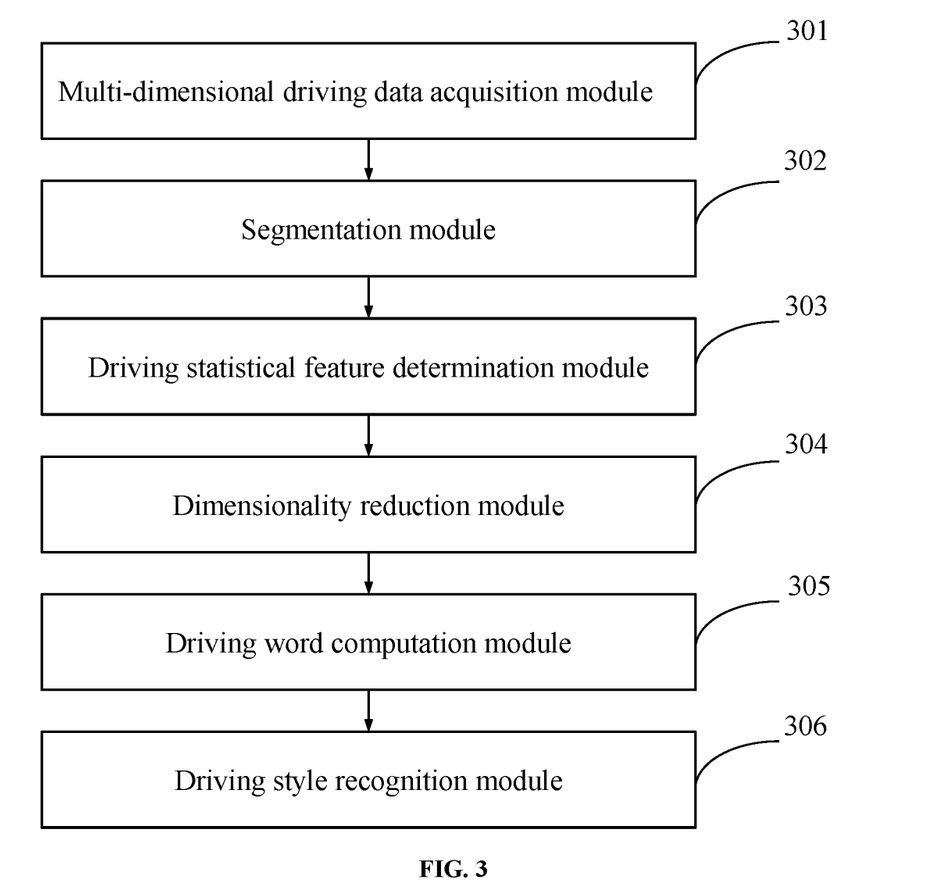
FIG. 3 is a structural diagram illustrating a system for recognizing continuous driving style according to the present disclosure.

As shown in FIG. 3, a system for recognizing continuous driving style comprises a multi-dimensional driving data acquisition module 301, a segmentation module 302, a driving statistical feature determination module 303, a dimensionality reduction module 304, a driving word computation module 305, and a driving style recognition module 306.

The multi-dimensional driving data acquisition module 301 is configured to collect multi-dimensional driving data from multiple drivers in daily driving scenarios. The multi-dimensional driving data includes vehicle state data and driver operation data. The vehicle state data includes speed, longitudinal acceleration, lateral acceleration, and yaw rate. The driver operation data includes throttle pedal position, brake pressure, and steering wheel angle.

The segmentation module 302 is configured to segment the multi-dimensional driving data to obtain multiple driving segments.

The driving statistical feature determination module 303 is configured to calculate statistical features of the multi-dimensional driving data for each the driving segment, to determine high-dimensional continuous driving statistical features for all driving segments.

The dimensionality reduction module 304 is configured to reduce dimensionality of the high-dimensional continuous driving statistical features, to generate common factors for each driving segment.

The driving word computation module 305 is configured to represent each driving segment with a driving word based on the common factors and represent all driving segments of a target driver as a driving word sequence based on driving words. The driving words follow a first categorical distribution with the basic driving styles as parameters, and the basic driving styles include an aggressive driving style and a moderate driving style.

The driving style recognition module 306 is configured to input the driving word sequence into a hierarchical latent model of driving behavior, and output, by the hierarchical latent model, the continuous driving style of the target driver. The hierarchical latent model of driving behavior is constructed based on the basic driving styles and the driving word corresponding to each driving segment. The continuous driving style is mixture proportions of the basic driving styles learned from the driving word sequence.

In practical applications, the driving word computation module comprises: an equally dividing unit configured to divide common factors of all segments, by using histogram statistics, into multiple intervals with an equal probability; and a driving word construction unit configured to construct driving words based on the number of common factors and the number of intervals.

In practical applications, a construction process of the hierarchical latent model of driving behavior comprises: a driving behavior hierarchical latent model construction unit configured to utilize a latent variable to represent the basic driving styles, and construct a three-layer driving behavior model by using a probability model based on the basic driving styles and the driving words corresponding to each driving segment. The three-layer driving behavior model comprises a driver layer, —a basic driving style layer and —a driving word layer, and the three-layer driving behavior model is the hierarchical latent model of driving behavior. The basic driving styles follow a second categorical distribution with the continuous driving style of the target driver as a parameter. The basic driving styles corresponding to each driving segment are sampled from a driver layer-basic driving style layer categorical distribution, to generate a basic driving style sequence corresponding to all the driving segments. Based on the basic driving style sequence, the driving word corresponding to each driving segment is sampled from a basic driving style layer-driving word layer categorical distribution.

Example 3

In an embodiment of the present disclosure, an electronic apparatus is provided, including a memory configured to store a computer program and a processor. The processor executes the computer program to enable the electronic apparatus to perform the method for recognizing continuous driving style provided in Example 1.

In practical applications, the electronic apparatus described above may be a server.

In practical applications, the electronic apparatus includes at least one processor, a memory, a bus, and a communications interface.

Specifically, the processor, the communication interface, and memory communicate with each other via a communication bus.

The communication interface is used for communicating with other devices.

The processor is configured to execute programs, to implement the method described in the above embodiment.

The program may include program code, which includes computer operation instructions.

The processor may be a Central Processing Unit (CPU), an Application Specific Integrated Circuit (ASIC), or one or more integrated circuits configured to implement the embodiments of the present disclosure. The electronic apparatus may include one or more processors of the same type such as one or more CPUs, or processors of different types such as one or more CPUs and one or more ASICs.

The memory is configured to store programs and may include high-speed RAM storage and non-volatile memory such as at least one disk storage.

Based on the description of the embodiments above, this application embodiment provides a storage medium have computer program instructions embodied therein. These computer program instructions may be executed by a processor to implement the methods described in any of the embodiments.

In various embodiments provided by this application, the system for recognizing continuous driving style exists in multiple forms, including but not limited to the following:

(1) Mobile Communication Devices: These devices are characterized by their mobile communication capabilities, and primarily aimed at providing voice and data communication. Such terminals include smartphones (e.g., iPhone), multimedia phones, feature phones, as well as basic mobile phones, among others.

(2) Ultra-Mobile Personal Computing Devices: These devices fall within the category of personal computing devices and possess computing and processing capabilities, typically with mobile internet connectivity. Such terminals encompass PDAs (Personal Digital Assistants), MID (Mobile Internet Device), and UMPC (Ultra-Mobile Personal Computer) devices, such as the iPad.

(3) Portable Entertainment Devices: These devices may display and play multimedia content. This category includes audio and video players (e.g., iPods), handheld gaming consoles, e-readers, as well as smart toys and portable in-car navigation devices.

(4) Other Electronic Devices with Data Interactivity Functions.

(5) Automotive Control Unit: These devices belong to the realm of microcomputers and possess computing and processing capabilities while being capable of data communication with automobiles. Such terminals include embedded microcontroller unit, industrial personal computers, onboard computers, advanced driver-assistance systems, and so on.

Thus far, specific embodiments of the subject matter have been described. Other embodiments fall within the scope of the attached claims. In some instances, actions recited in the claims may be performed in a different order and still achieve the desired results. Additionally, processes depicted in the drawings do not necessarily require specific sequential or continuous order to achieve the desired results. In some embodiments, multitasking and parallel processing may be advantageous.

The systems, devices, modules, or units described in the above embodiments may be implemented by computer chips or entities, or by products with certain functionalities. A typical implementation device is a computer. Specifically, a computer may include a personal computer, laptop computer, cellular phone, camera phone, smartphone, personal digital assistant, media player, navigation device, email device, game console, tablet computer, wearable device, or a combination of any of these devices.

For ease of description, the above devices are described separately according to their functions. Of course, the functionality of each unit may be implemented in one or multiple software and/or hardware components when implementing the application. Those skilled in the art will understand that embodiments of the present application may be provided as methods, systems, or computer program products. Thus, the application may take the form of fully hardware embodiments, fully software embodiments, or embodiments combining software and hardware aspects. Furthermore, the application may be in the form of a computer program product implemented on one or more computer-readable storage media (including but not limited to disk storage, CD-ROMs, optical storage, etc.) that contain computer program code usable by a computer.

This application is described with reference to flowcharts and/or block diagrams of methods, devices (systems), and computer program products according to embodiments of this application. It will be understood that each block and/or each process of the block diagrams and/or flowchart illustrations, and combinations of blocks and/or processes in the block diagrams and/or flowchart illustrations, respectively, may be implemented by computer program instructions. These computer program instructions may be loaded onto a general purpose computer, a special purpose computer, an embedded processor or other programmable data processing apparatus to produce a machine, such that the instructions which execute on the computer or other programmable data processing apparatus create a means for implementing the functions specified one or more processes in the flowchart block or specified one or more blocks in the block diagrams.

These computer program instructions may also be stored in a computer-readable memory that may direct a computer or other programmable data processing apparatus to work in a specific manner, such that the instructions stored in the computer-readable memory produce an article of manufacture, including instructions that implement the functions specified one or more processes in the flowchart block or specified one or more blocks in the block diagrams.

These computer program instructions may also be loaded onto a computer or other programmable data processing apparatus, causing a series of operations to be performed on the computer or other programmable apparatus to produce a computer-implemented process. Thus, the instructions executed on the computer or other programmable apparatus provide steps for implementing the functions specified one or more processes in the flowchart block or specified one or more blocks in the block diagrams.

In a typical configuration, a computing device includes one or more processors (CPU), input/output interfaces, network interfaces, and memory.

The memory may include non-permanent storage media in computer-readable media, random-access memory (RAM), and/or non-volatile memory forms, such as read-only memory (ROM) or flash memory. The memory is an example of computer-readable media.

The computer-readable media include permanent and non-permanent, movable, and non-movable media, which may be implemented for information storage by any method or technology. Information may be computer-readable instructions, data structures, program modules, or other data. Examples of computer storage media include, but are not limited to, phase-change memory (PRAM), static random-access memory (SRAM), dynamic random-access memory (DRAM), other types of random-access memory (RAM), read-only memory (ROM), electrically erasable programmable read-only memory (EEPROM), flash memory or other memory technologies, read-only optical discs (CD-ROM), digital versatile discs (DVDs) or other optical storage, floppy disks, magnetic tapes, magnetic disk storage, or other magnetic storage devices, or any other non-transitory media, which may be used to store information accessible by a computing device. By the definition provided herein, computer-readable media does not include transitory media, such as modulated data signals and carriers.

Furthermore, it should be noted that the terms "comprise," "include," or any variations thereof are intended to encompass non-exclusive inclusion, such that a process, method, article, or device that comprises a series of elements may include additional elements not explicitly listed or may include elements inherently present in the process, method, article, or device. In the absence of further limitations, the element specified in "comprising a . . . " does not exclude the presence of other identical elements in the process, method, article, or device that includes the specified element.

This application may be described in the general context of computer-executable instructions executed by a computer, such as program modules. In general, program modules include routines, programs, objects, components, data structures, and the like that perform specific tasks or implement specific abstract data types. The present application may also be practiced in a distributed computing environment, where transactions are executed by remote processing devices connected via a communication network. In a distributed computing environment, program modules may be located in both local computer storage media and remote computer storage media, including storage devices.

The various embodiments in this specification are described in a progressive manner, with each embodiment emphasizing the differences from other embodiments. Similar or identical aspects among the various embodiments can be cross-referenced as needed. For systems disclosed in embodiments, the description is relatively brief since they correspond to the methods disclosed in the respective embodiments; relevant details can be found in the method sections.

Specific examples have been used in this document to illustrate the principles and implementation of the present disclosure. These examples are provided to facilitate an understanding of the methods and core concepts of the present disclosure. Simultaneously, those skilled in the art will recognize that variations may occur in specific implementations and applications of the present disclosure. Therefore, the content of this specification should not be construed as limiting the scope of the present disclosure.

What is claimed is:

1. A method for recognizing continuous driving style, comprising:
    collecting multi-dimensional driving data from a plurality of drivers in daily driving scenarios, wherein the multi-dimensional driving data comprises vehicle state data and driver operation data, wherein the vehicle state data comprises speed, longitudinal acceleration, lateral acceleration and yaw rate, and the driver operation data comprises throttle pedal position, brake pressure, and steering wheel angle;

segmenting the multi-dimensional driving data to obtain a plurality of driving segments;

calculating statistical features of the multi-dimensional driving data for each driving segment to determine high-dimensional continuous driving statistical features for all the driving segments;

reducing dimensionality of the high-dimensional continuous driving statistical features to generate common factors for each driving segment;

representing each driving segment with a driving word based on the common factors, and representing all the driving segments of a target driver as a driving word sequence based on driving words; wherein the driving words follow a first categorical distribution with basic driving styles as parameters, and the basic driving styles comprise an aggressive driving style and a moderate driving style; and inputting the driving word sequence into a hierarchical latent model of driving behavior, and outputting, by the hierarchical latent model, the continuous driving style of the target driver; wherein the hierarchical latent model of the driving behavior is constructed based on the basic driving styles and the driving word corresponding to each driving segment, and the continuous driving style is mixture proportions of the basic driving styles learned from the driving word sequence.

2. The method of claim 1, wherein the segmenting the multi-dimensional driving data to obtain a plurality of driving segments comprises:

segmenting time sequence of the multi-dimensional driving data by employing a time window, to determine the plurality of driving segments.

3. The method of claim 1, wherein the reducing dimensionality of the high-dimensional continuous driving statistical features to generate common factors for each driving segment comprises:

reducing the dimensionality of the high-dimensional continuous driving statistical features by employing factor analysis, to generate the common factors for each driving segment, wherein a formula of the factor analysis is: $Y=AF+e$, wherein Y represents the driving statistical features, A denotes a factor loading matrix, F denotes a common factor matrix and e is an error term.

4. The method of claim 1, wherein the representing each driving segment with a driving word based on the common factors comprises:

dividing common factors of all the driving segments, by using histogram statistics, into a plurality of intervals with an equal probability; and constructing the driving words based on a number of the common factors and a number of the intervals.

5. The method of claim 1, wherein a construction process of the hierarchical latent model of the driving behavior comprises:

utilizing a latent variable to represent the basic driving styles, and constructing a three-layer driving behavior model by using a probabilistic model based on the basic driving styles and the driving word corresponding to each driving segment, wherein the three-layer driving behavior model comprises a driver layer, a basic driving style layer, and a driving word layer, and the three-layer driving behavior model is the hierarchical latent model of the driving behavior;

the basic driving styles follow a second categorical distribution with the continuous driving style of the target driver as a parameter;

the basic driving styles corresponding to each driving segment are sampled from a driver layer-basic driving style layer categorical distribution, to generate a basic driving style sequence corresponding to all the driving segments; and based on the basic driving style sequence, the driving word corresponding to each driving segment is sampled from a basic driving style layer-driving word layer categorical distribution.

6. A system for recognizing continuous driving style, comprising:

a multi-dimensional driving data acquisition module, configured to collect multi-dimensional driving data from a plurality of drivers in daily driving scenarios, wherein the multi-dimensional driving data comprises vehicle state data and driver operation data, wherein the vehicle state data comprises speed, longitudinal acceleration, lateral acceleration and yaw rate, and the driver operation data comprises throttle pedal position, brake pressure, and steering wheel angle;

a segmentation module, configured to segment the multi-dimensional driving data to obtain a plurality of driving segments;

a driving statistical feature determination module, configured to calculate statistical features of the multi-dimensional driving data for each driving segment to determine high-dimensional continuous driving statistical features for all the driving segments;

a dimensionality reduction module, configured to reduce dimensionality of the high-dimensional continuous driving statistical features to generate common factors for each driving segment;

a driving word computation module, configured to represent each driving segment with a driving word based on the common factors, and represent all the driving segments of a target driver as a driving word sequence based on driving words; wherein the driving words follow a first categorical distribution with basic driving styles as parameters, and the basic driving styles comprise an aggressive driving style and a moderate driving style; and a driving style recognition module, configured to input the driving word sequence into a hierarchical latent model of driving behavior, and output, by the hierarchical latent model, the continuous driving style of the target driver; wherein the hierarchical latent model of the driving behavior is constructed based on the basic driving styles and the driving word corresponding to each driving segment, and the continuous driving style is mixture proportions of the basic driving styles learned from the driving word sequence.

7. The system of claim 6, wherein the driving word computation module comprises:

an equally dividing unit, configured to divide common factors of all the driving segments, by using histogram statistics, into a plurality of intervals with an equal probability; and a driving word construction unit, configured to construct driving words based on a number of the common factors and a number of the intervals.

8. The system of claim 6, wherein a construction process of the hierarchical latent model of the driving behavior comprises:
- a driving behavior hierarchical latent model construction unit, configured to utilize a latent variable to represent the basic driving styles and construct a three-layer driving behavior model by using a probabilistic model based on the basic driving styles and the driving word corresponding to each driving segment;
- wherein the three-layer driving behavior model comprises a driver layer, a basic driving style layer and a driving word layer, and the three-layer driving behavior model is the hierarchical latent model of the driving behavior;
- the basic driving styles follow a second categorical distribution with the continuous driving style of the target driver as a parameter;
- the basic driving styles corresponding to each driving segment are sampled from a driver layer-basic driving style layer categorical distribution to generate a basic driving style sequence corresponding to all the driving segments; and
- based on the basic driving style sequence, the driving word corresponding to each driving segment is sampled from a basic driving style layer-driving word layer categorical distribution.

9. An electronic apparatus, comprising
a memory, configured to store a computer program; and
a processor, wherein
the processor executes the computer program such that the electronic apparatus implements the method for recognizing the continuous driving style of claim 1.

10. The electronic apparatus of claim 9, wherein the segmenting the multi-dimensional driving data to obtain a plurality of driving segments comprises:
- segmenting time sequence of the multi-dimensional driving data by employing a time window, to determine the plurality of driving segments.

11. The electronic apparatus of claim 9, wherein the reducing dimensionality of the high-dimensional continuous driving statistical features to generate common factors for each driving segment comprises:
- reducing the dimensionality of the high-dimensional continuous driving statistical features by employing factor analysis, to generate the common factors for each driving segment, wherein a formula of the factor analysis is: $Y=AF+e$, wherein Y represents the driving statistical features, A denotes a factor loading matrix, F denotes a common factor matrix and e is an error term.

12. The electronic apparatus of claim 9, wherein the representing each driving segment with a driving word based on the common factors comprises:
- dividing common factors of all the driving segments, by using histogram statistics, into a plurality of intervals with an equal probability; and
- constructing the driving words based on a number of the common factors and a number of the intervals.

13. The electronic apparatus of claim 9, wherein a construction process of the hierarchical latent model of the driving behavior comprises:
- utilizing a latent variable to represent the basic driving styles, and constructing a three-layer driving behavior model by using a probabilistic model based on the basic driving styles and the driving word corresponding to each driving segment,
- wherein the three-layer driving behavior model comprises a driver layer, a basic driving style layer and a driving word layer, and the three-layer driving behavior model is the hierarchical latent model of the driving behavior;
- the basic driving styles follow a second categorical distribution with the continuous driving style of the target driver as a parameter;
- the basic driving styles corresponding to each driving segment are sampled from a driver layer-basic driving style layer categorical distribution, to generate a basic driving style sequence corresponding to all the driving segments; and
- based on the basic driving style sequence, the driving word corresponding to each driving segment is sampled from a basic driving style layer-driving word layer categorical distribution.

14. A non-transitory computer-readable storage medium having a computer program embodied therein, wherein the method for recognizing the continuous driving style of claim 1 is implemented when the computer program is executed by a processor.

15. The non-transitory computer-readable storage medium of claim 14, wherein the segmenting the multi-dimensional driving data to obtain a plurality of driving segments comprises:
- segmenting time sequence of the multi-dimensional driving data by employing a time window, to determine the plurality of driving segments.

16. The non-transitory computer-readable storage medium of claim 14, wherein the reducing dimensionality of the high-dimensional continuous driving statistical features to generate common factors for each driving segment comprises:
- reducing the dimensionality of the high-dimensional continuous driving statistical features by employing factor analysis, to generate the common factors for each driving segment, wherein a formula of the factor analysis is: $Y=AF+e$, wherein Y represents the driving statistical features, A denotes a factor loading matrix, F denotes a common factor matrix and e is an error term.

17. The non-transitory computer-readable storage medium of claim 14, wherein the representing each driving segment with a driving word based on the common factors comprises:
- dividing common factors of all the driving segments, by using histogram statistics, into a plurality of intervals with an equal probability; and
- constructing the driving words based on a number of the common factors and a number of the intervals.

18. The non-transitory computer-readable storage medium of claim 14, wherein a construction process of the hierarchical latent model of the driving behavior comprises:
- utilizing a latent variable to represent the basic driving styles, and constructing a three-layer driving behavior model by using a probabilistic model based on the basic driving styles and the driving word corresponding to each driving segment,
- wherein the three-layer driving behavior model comprises a driver layer, a basic driving style layer and a driving word layer, and the three-layer driving behavior model is the hierarchical latent model of the driving behavior;
- the basic driving styles follow a second categorical distribution with the continuous driving style of the target driver as a parameter;
- the basic driving styles corresponding to each driving segment are sampled from a driver layer-basic driving style layer categorical distribution, to generate a basic driving style sequence corresponding to all the driving segments; and based on the basic driving style sequence, the driving word corresponding to each driving segment is sampled from a basic driving style layer-driving word layer categorical distribution.

\* \* \* \* \*